United States Patent [19]

Kasenga et al.

[11] 4,266,161
[45] May 5, 1981

[54] COOL WHITE LAMP USING A TWO-COMPONENT PHOSPHOR

[75] Inventors: Anthony F. Kasenga; Charles F. Chenot, both of Towanda, Pa.

[73] Assignee: GTE Products Corporation, Stamford, Conn.

[21] Appl. No.: 51,304

[22] Filed: Jun. 22, 1979

[51] Int. Cl.³ ............ C09K 11/12; C09K 11/24; C09K 11/42; H01J 61/44
[52] U.S. Cl. .............................. 313/487; 252/301.4 P
[58] Field of Search ................. 252/301.4 P; 13/487

[56] References Cited

U.S. PATENT DOCUMENTS

| | | |
|---|---|---|
| 2,488,733 | 11/1949 | McKeag et al. |
| 2,965,786 | 12/1960 | Aia et al. |
| 3,513,103 | 5/1970 | Shaffer |
| 3,549,552 | 12/1970 | Van Broekhoven |
| 3,670,194 | 6/1972 | Thornton, Jr. et al. |
| 4,038,204 | 7/1977 | Wachtel |
| 4,075,532 | 2/1978 | Piper et al. |

FOREIGN PATENT DOCUMENTS

956451 10/1974 Canada.

OTHER PUBLICATIONS

"Optimum Phosphor Blends for Fluorescent Lamps", by W. Walter, *Applied Optics*, vol. 10, No. 5, May 1971, pp. 1108–1113.

*Primary Examiner*—Palmer C. Demeo
*Attorney, Agent, or Firm*—Donald R. Castle

[57] ABSTRACT

A fluorescent lamps having chromaticity coordinates similar to cool white can be prepared using two component compositions. A blue emitting strontium-barium chlorapatite activated with europium and a yellow emitting calcium-strontium fluorapatite applied as a blend or as two distinct layers yields a lamp equivalent in chromaticity to a standard cool white lamp with a higher lumer per watt than the standard cool white lamp.

3 Claims, 3 Drawing Figures

COOL WHITE LAMP USING A TWO-COMPONENT PHOSPHOR

BACKGROUND OF THE INVENTION

U.S. Pat. No. 4,075,532 discloses an improved cool white fluorescent lamp utilizing a two-component phosphor combination. The yellow emitting phosphor is disclosed as being as calcium fluoroapatite and two blue phosphors are disclosed which are a europium-activated strontium chloroapatite and a europium-activated barium-magnesium aluminate. The calcium fluoroapatite phosphor has an emission at one particular point on the CIE diagram at a given level of manganese activator. Therefore, the potential blue components that can be utilized with this material are somewhat limited. In addition, the strontium chloroapatite activated with europium is a material which also emits at a specific point on the chromaticity diagram. Furthermore, the europium-activated strontium chloroapatite is not as efficient phosphor as some other phosphors.

It is believed, therefore, that a combination which enables the use of a more efficient and brighter blue emitting phosphor in combination with a new yellow emitting phosphor component would be an advancement in the art.

OBJECTS AND SUMMARY OF THE INVENTION

It is an object of this invention to provide a more efficient cool white fluorescent lamp utilizing a two-component phosphor which yields lamps having a higher lumens per watt then the standard cool white lamp without a major sacrifice in color rendition.

In accordance with one aspect of this invention there is provided a fluorescent lamp which contains a europium-activated barium-strontium chlorapatite activator with europium in combination with manganese and antimony activated calcium-strontium fluoroapatite.

For a better understanding of the present invention, together with other and further objects advantages and capabilities thereof, reference is made to the following disclosure and appended claims in connection with the above-described drawings.

DETAILS OF THE PREFERRED EMBODIMENTS

The blue-emitting phosphor composition useful in the practice of this invention can be defined by the formula, $(Sr_{1-x}Ba_x)_{5-y} Eu_y (PO_4)_3 Cl$ wherein x is from about 0.01 to about 0.62, y is from about 0.005 to about 0.15. The barium containing chloroapatites of the foregoing formula are more efficient than the europium-activated strontium chlorophosphate.

As shown in Table 1 below, fluorescent lamps were prepared using the various phosphors wherein the value of x, (the barium content) was varied as shown in the Table up to about 62% substitution of the strontium by barium. As is shown in Table I, the lumen output of the strontium barium chloroapatite is increased rather rapidly from about 2% of substitution of strontium with barium until about 48% of the strontium is substituted by barium. At that point, the increase in lumens tends to level off and at above about a 62% substitution of barium for strontium, the lumen output from the lamps remains relatively constant.

TABLE I

| Sr$_{4.9-x}$Ba$_x$Eu$_{0.1}$Cl(PO$_4$)$_3$ | |
|---|---|
| Value of x | Lumens (100 hr) |
| 0 | 444 |
| 0.1 | 503 |
| 0.18 | 542 |
| 0.32 | 647 |
| 0.56 | 801 |
| 0.68 | 856 |
| 0.75 | 906 |
| 1.0 | 1063 |
| 1.33 | 1249 |
| 1.78 | 1492 |
| 2.37 | 1628 |
| 3.0 | 1640 |

Figure 2:
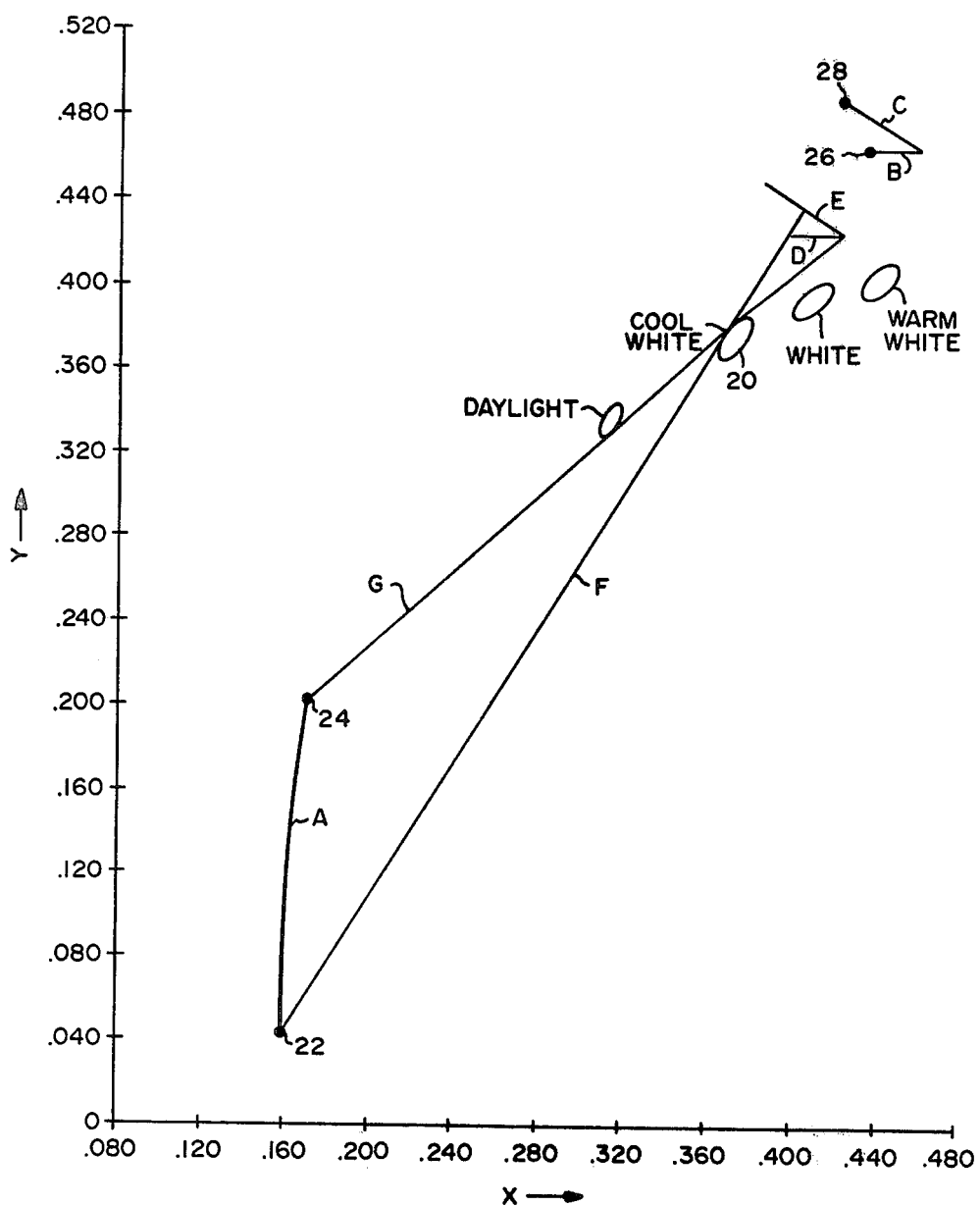
FIG. 2 is a portion of the CIE diagram containing information useful to understanding the present invention.

With particular reference to FIG. 2, line A represents the chromaticity coordinates of the europium-activated barium strontium chloroapatite. In FIG. 2 point 22 represents the chromaticity coordinates of the europium activated strontium chloroapatite given in Table I and point 24 represents the chromaticity coordinates in europium activated barium-strontium composition wherein x is 3.0.

Compositions that can be employed with the barium modified strontium chloroapatite activated with europium can either be a manganese and antimony calcium fluorapatite or a composition in which up to about 80% of the calcium is replaced with strontium. Therefore, the useful manganese-antimony calcium-strontium chloroapatite phosphors have the formula, $$[Ca_{1-a}Sr_a]_{5.0-w-x-y}Cd_wMn_xSb_y(PO_4)_3F_{1-y}O_y$$

wherein
 a is from about 0 to about 0.8
 w is from 0 to about 0.2
 x is from about 0.05 to about 0.5
 y is from about 0.02 to about 0.2

With particular reference to FIG. 2 a composition of the formula

$$Ca_{4.795}Cd_{0.025}Md_{0.15}Sb_{0.03}(PO_4)_3F_{0.097}O_{0.03}$$

has been found to have chromaticity coordinates of x=0.434 and y=0.464 and is depicted by point 26 in FIG. 2. A similar phosphor of essentially the same composition except that strontium is substituted for calcium as chromaticity coordinates 0.421 and y=0.488. This is depicted by number 28 in FIG. 2. As up to about 40% of the calcium is replaced by strontium, the chromaticity resulting compositions fall along line B in FIG. 2. When from about 40 to 100% of the calcium is replaced with strontium, the chromaticity of the resulting compositions fall along line C in FIG. 2. The foregoing data is produced from phosphors having a constant manganese content of about 0.15 in the above formula, however, the same effect results in the compositions having a lower or higher level of manganese except the compositions containing lower levels of manganese are more blue and those containing higher levels are more red. As the mercury lines are taken into effect, a shift in the combined chromaticity causes a shift from line B to line D in FIG. 2 and line C to line E. As can be appreciated from FIG. 2, the foregoing europium-activated barium-strontium chloroapatite phosphors can be utilized only with certain compositions of the yellow emitting phosphors disclosed above. As is seen from FIG. 2, lines F and G that are projected from Line A and are either tangent to or inside ellipse 20 intersect lines D and E such that it enables the yellow emitting phosphors containing up to 80% replacement of calcium by strontium.

Figure 1:
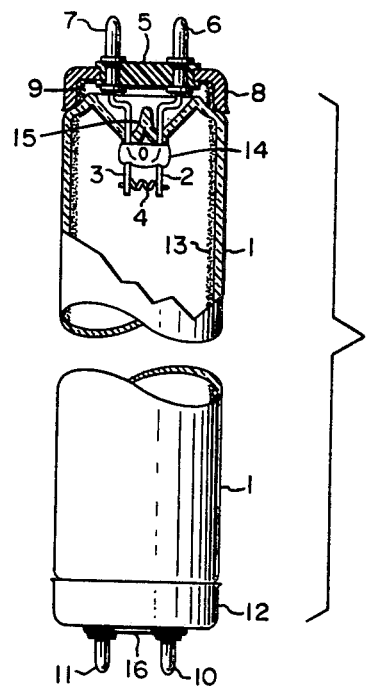
FIG. 1 is a fluorescent lamp of the present invention.
Figure 3:
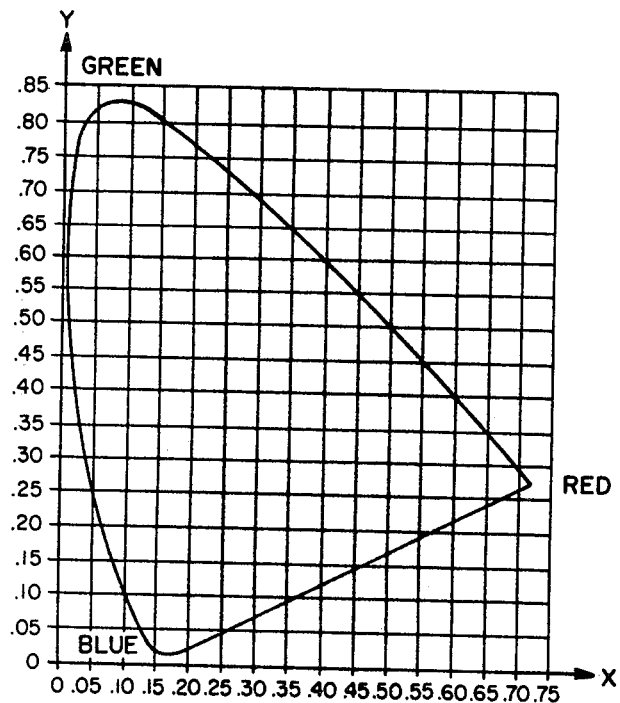
FIG. 3 is a reproduction of the complete CIE chromaticity diagram.

With particular reference to FIG. 1, the sealed glass envelope 1 has the lead-in wires 2, 3, sealed through one of its ends and corresponding lead-in wires sealed through the other end. The usual coiled-coil 4 of tungsten wire is supported between, and electrically connected to, the pair of lead-in wires 2, 3, and a similar coil is supported by and connected to the lead in wires at the other end of the envelope 1. An insulating base piece 5 having contact pins 6 and 7, each pin being connected to one of the lead-in wires, held in the metal cap 8, which is fixed by the cement 9 to one end of the envelope 1, and a similar base piece 16, having contact pins 10 and 11, is cemented to the other end by cup 12.

The tungsten coils carry the usual electron-emitting coating of alkaline earth oxides, generally including also a small percentage of zirconium oxide.

A filling of inert gas such as argon, neon, krypton, and mixtures thereof, at about 2 millimeters of mercury pressure, and the usual small quantity of mercury is inside the glass envelope 1. The lamp has the usual stem press 14 and sealed exhaust tube 15.

On the inside surface of the envelope, is a layer 13 of the two component phosphor system described herein. Under present lamp manufacturing methods it is preferred to use a relatively uniform blend of the two component system, however, the present invention is not so limited. It is merely necessary that each of the phosphors be uniformly distributed over the internal surface of the glass envelope.

If a uniform blend is utilized from about 5 to about 40% by weight of the blue emitting component is used. The amounts of the blue-emitting and the yellow-emitting components will depend upon the particular components chosen. As is known in the art when the phosphors are of the same quantum efficiency the levels of each phosphor can be determined by measuring the distance on the CIE diagram from the desired cool white target of x=0.372 and y=0.375 to the x and y coordinates of the blue emitting component and from the cool white target to x and y coordinates of the yellow emitting phosphors corrected for the mercury emission. The amount of each component would be inversely proportional to the distances each of the phosphors are from the aforementioned daylight target. As is also known in the art corrections must be made for the relative quantum efficiencies of the individual phosphors.

If desired, the individual phosphors can be applied to the envelope as separate layers in which case due to the inner layer being exposed to the more intense ultraviolet radiation the amount of the phosphor chosen as the inner layer is reduced from that required in a blend. The amount can be reduced to about 90% of that required in when a uniform blend is used. Therefore, in the case where the blue component is used as the inner layer from about 1 to about 30% of the total phosphor component would be the blue emitting phosphor. In the present invention it is preferred to apply the yellow emitting phosphor as the outer layer and the blue emitting phosphor as the inner layer, however, it is not required. Thus, in the practice of this invention from about 1% to about 60% of the total phosphor content can be the blue emitting phosphor and the balance is the yellow emitting phosphor depending upon the method used to deposit the phosphors.

While there has been shown and described what are at present considered the preferred embodiments of the invention, it will be obvious to those skilled in the art that various changes and modifications may be made therein without departing from the scope of the invention as defined by the appended claims.

What is claimed is:

1. A fluorescent lamp comprising a sealed envelope, electrodes, a filling of an inert gas, and mercury therein, and a coating of a phosphor component on the inside surface of said envelope, characterized in that said phosphor component consisting essentially of from about 1 to about 60 weight percent of a blue emitting phosphor having the formula, $(Sr_{1-x}Ba_x)_{5-y}Eu_y Cl(PO_4)_3$, wherein x is from 0.01 to about 0.62 and y is from about 0.005 to about 0.15, the balance being a yellow emitting phosphor composition having the formula, $[Ca_{1-a}Sr_a]_{5-w-x-y}Cd_w Mn_x Sb_y(PO_4)_3 F_{1-y}O_y$, a is from 0 to about 0.8, w is from 0 to about 0.05, x is from about 0.005 to about 0.17, y is from about 0.02 to about 0.04, said lamp exhibiting a color falling within the cool white ellipse on the CIE diagram.

2. A fluorescent lamp according to claim 1 wherein phosphor is deposited as a blend and said blue emitting phosphor is from about 5 to about 40 weight percent of the total phosphor composition.

3. A fluorescent lamp according to claim 1 wherein said phosphor component consists of an inner layer of the blue emitting phosphor component and said inner layer constitutes from about 1 to about 30% of the total phosphor content.

* * * * *